(12) United States Patent
Pieri

(10) Patent No.: US 6,789,780 B2
(45) Date of Patent: Sep. 14, 2004

(54) UNIT AND METHOD FOR DISCHARGING LOOSE MATERIAL FROM A DISPENSING DEVICE

(75) Inventor: Luciano Pieri, Lucca (IT)

(73) Assignee: Romaco S.r.l., Pianoro Bologna (IT)

(*) Notice: Subject to any disclaimer, the term of this patent is extended or adjusted under 35 U.S.C. 154(b) by 235 days.

(21) Appl. No.: 10/125,155

(22) Filed: Apr. 18, 2002

(65) Prior Publication Data

US 2002/0158086 A1 Oct. 31, 2002

(30) Foreign Application Priority Data

Apr. 27, 2001 (IT) .................................... BO2001A0261

(51) Int. Cl.[7] .............................................. F16K 25/00
(52) U.S. Cl. ...................................... 251/175; 137/242
(58) Field of Search ........................... 251/175; 137/242

(56) References Cited

U.S. PATENT DOCUMENTS

| | | | | |
|---|---|---|---|---|
| 5,351,864 A | * | 10/1994 | Semenenko et al. | ........ 222/504 |
| 5,884,660 A | | 3/1999 | Cathrein et al. | |
| 5,934,517 A | * | 8/1999 | Pieri | ........ 222/185.1 |
| 6,412,518 B1 | * | 7/2002 | Pieri | ........ 137/614.01 |

FOREIGN PATENT DOCUMENTS

| | | |
|---|---|---|
| DE | 44 15 488 A1 | 11/1995 |
| DE | 200 14 872 U1 | 1/2001 |
| EP | 1 043 252 A1 | 10/2000 |

OTHER PUBLICATIONS

Annex to the European Search Report on European Patent Application No. EP 02 42 5253.

* cited by examiner

Primary Examiner—Philippe Derakshani
(74) Attorney, Agent, or Firm—Fay, Sharpe, Fagan, Minnich & McKee, LLP

(57) ABSTRACT

A unit for discharging loose material from a dispensing device to a user unit comprises a discharge tube leading to the user unit and a valve element connecting the dispensing device to the infeed end of the tube. The valve element comprises a first annular element equipped with a shutter device, consisting of a first shutoff element and a second shutoff element connected to each other by permanent magnets, and a second annular element connected to the infeed end of the tube. When the first and second annular elements are separated by the operation of pistons, a gap is created between the two shutoff elements. A pair of concentric seals positioned between the first and the second annular elements isolate the gap from the outside environment so that a cleaning fluid can be made to flow into it.

16 Claims, 5 Drawing Sheets

UNIT AND METHOD FOR DISCHARGING LOOSE MATERIAL FROM A DISPENSING DEVICE

BACKGROUND OF THE INVENTION

The present invention relates to a unit for discharging loose material from a dispensing device.

The unit can be used in particular in the chemical and/or pharmaceutical industry and for any applications where containers of powder, fine-grain pellets or similar products need to be emptied.

The containers are emptied at a discharge station and the material they contain is transferred to a tank connected, for example, to a machine that uses the loose material for subsequent processes.

A supporting structure keeps the tank below the level of the container so that the container is emptied by gravity.

To transfer the material from the container to the tank, connection means, consisting, for example, of a rigid, cylindrical tube with a vertical axis, are used.

These connections must be well sealed so that the powdered material does not escape into the outside environment during its transfer through the tubular bag.

The seal must be especially effective if the powder concerned consists of chemical substances or compounds that are not biodegradable or potentially dangerous.

Moreover, when changing over from one material to another, the tubular bag must be substituted and the connection thoroughly cleaned.

Usually, the top end of the cylindrical tube is equipped with an airtight annular element or spacer designed to securely hold the top end of the tubular bag to the container.

The bottom outfeed end of the container mounts a valve element designed to open and close the bottom end itself.

This valve element usually consists of a butterfly valve equipped with a flat, disc-shaped shutter designed to rotate in both directions about a horizontal axis between a closed position where the shutter closes the bottom end of the container and lies in a substantially horizontal plane, and an open position where the shutter lies in a substantially vertical plane to enable the material to be discharged from the container into the cylindrical tube.

The bottom end of the annular element also has a removable shutoff element (shutter element).

Traditional discharge units of this type are unsatisfactory in that they contaminate the surrounding environment. The main disadvantage is due to the fact that the face of the disc-shaped element that faces the outside when the valve element is closed is turned in the vertical position while the container is being emptied and comes into contact with the powder product being discharged. Product thus sticks to the disc-shaped element and can be released into the surrounding environment when the valve element is closed.

Another disadvantage is that the top end of the spacer, which has also come into contact with the powder product, remains open while the container is being removed.

European patent publication EP 1.043.252 discloses a discharge unit in which the valve element consists not of a single disc-shaped element, as described above, but two disc-shaped shutoff elements that are superposed and releasably connected to each other.

The valve element opens and closes in the same way as the type described above but when the container is changed, the two elements are detached and one of them moves to a position where it closes the outfeed end of the empty container, while the other closes the top end of the spacer, preventing contact between the contaminated parts and the outside environment, facing the faces that were previously in contact with each other.

Although this type of discharge unit is a considerable improvement on traditional discharge units, it too has drawbacks relating to contamination of the environment.

It has been found that, when the two elements are turned to the vertical position and are covered by the product flowing over them during discharge operations, the close contact between the two superposed disc-shaped elements, accomplished by pneumatic or magnetic means does not prevent a significant quantity of powder from finding its way into the outermost portion of the two elements, which is substantially in the shape of a circular crown.

SUMMARY OF THE INVENTION

The aim of the present invention is to overcome the above mentioned drawback by providing a unit for discharging loose material from a container, whose components can be cleaned in place without permitting contamination of the outside environment.

In accordance with the invention, this aim is accomplished by a unit for discharging loose material from a dispensing device to a user unit, comprising a tube leading to the user unit, a valve element connecting the dispensing device to the tube infeed end, having an axis extending in a defined direction, the valve element comprising a first annular element, coaxial with the infeed end and comprising shutter means equipped with a first shutoff element and a second shutoff element connected to each other by releasable means and being mobile from a position in which the infeed end of the tube is closed by an airtight seal to a position where it is open, wherein the valve element comprises a second annular element coaxial with the first annular element and forming the infeed end of the tube, the first shutoff element consisting of a disc-shaped element for closing the first annular element, and the second shutoff element consisting of a screen for closing the second annular element, the valve element further comprising sealing means positioned between the first and second annular elements, separation means mobile between a first rest position where the first annular element and the related first shutoff element are respectively in contact with the second annular element and the related second shutoff element and a working position where the first and second annular elements are separated respectively from the related first and second shutoff means in such a way as to form between the shutoff elements a gap that is delimited by the sealing means, and means for cleaning the gap also being provided.

Another aim of the present invention is to provide a method for discharging loose material from a dispensing device to a user unit.

In accordance with the invention, this aim is accomplished by a method for discharging loose material from a dispensing device to a user unit, comprising a tube leading to one end of the user unit itself, a valve element connecting the dispensing device to the tube infeed end, having an axis extending in a defined direction, the valve element comprising a first annular element, coaxial with the infeed end and shutter means equipped with a first shutoff element and a second shutoff element connected to each other by releasable means and being mobile from a position in which the infeed end of the tube is closed by an airtight seal to a position where it is open, the method comprising the steps of: separating the first annular element from a second annular element, which is coaxial with the first annular element and which forms the infeed end of the tube, in such a way as to form a gap between the shutoff elements; isolating the gap through sealing means positioned between the first and second annular elements; and cleaning the gap.

BRIEF DESCRIPTION OF THE DRAWINGS

The invention will now be described with reference to the accompanying drawings which illustrate a preferred embodiment of it and in which.

DESCRIPTION OF THE PREFERRED EMBODIMENTS

Figure 1:
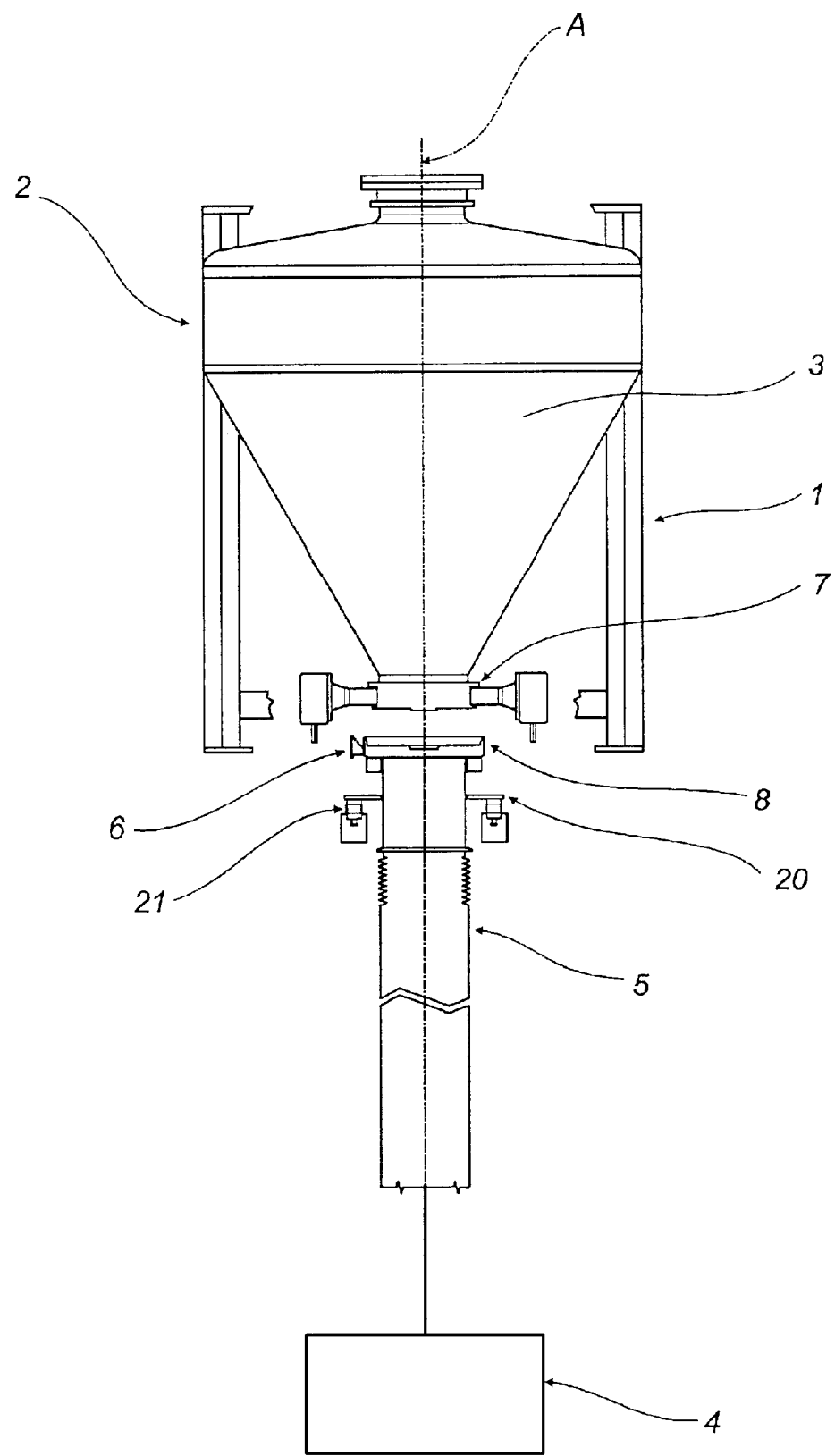
FIG. 1 is a schematic front assembly view of an embodiment of a unit made according to the present invention.

With reference to FIG. 1, the numeral 1 denotes in its entirety a unit for discharging loose material from a dispensing device 2, consisting in this particular instance of a container 3, to a user unit, which is schematically illustrated as block 4, through a tube 5.

Figure 2:
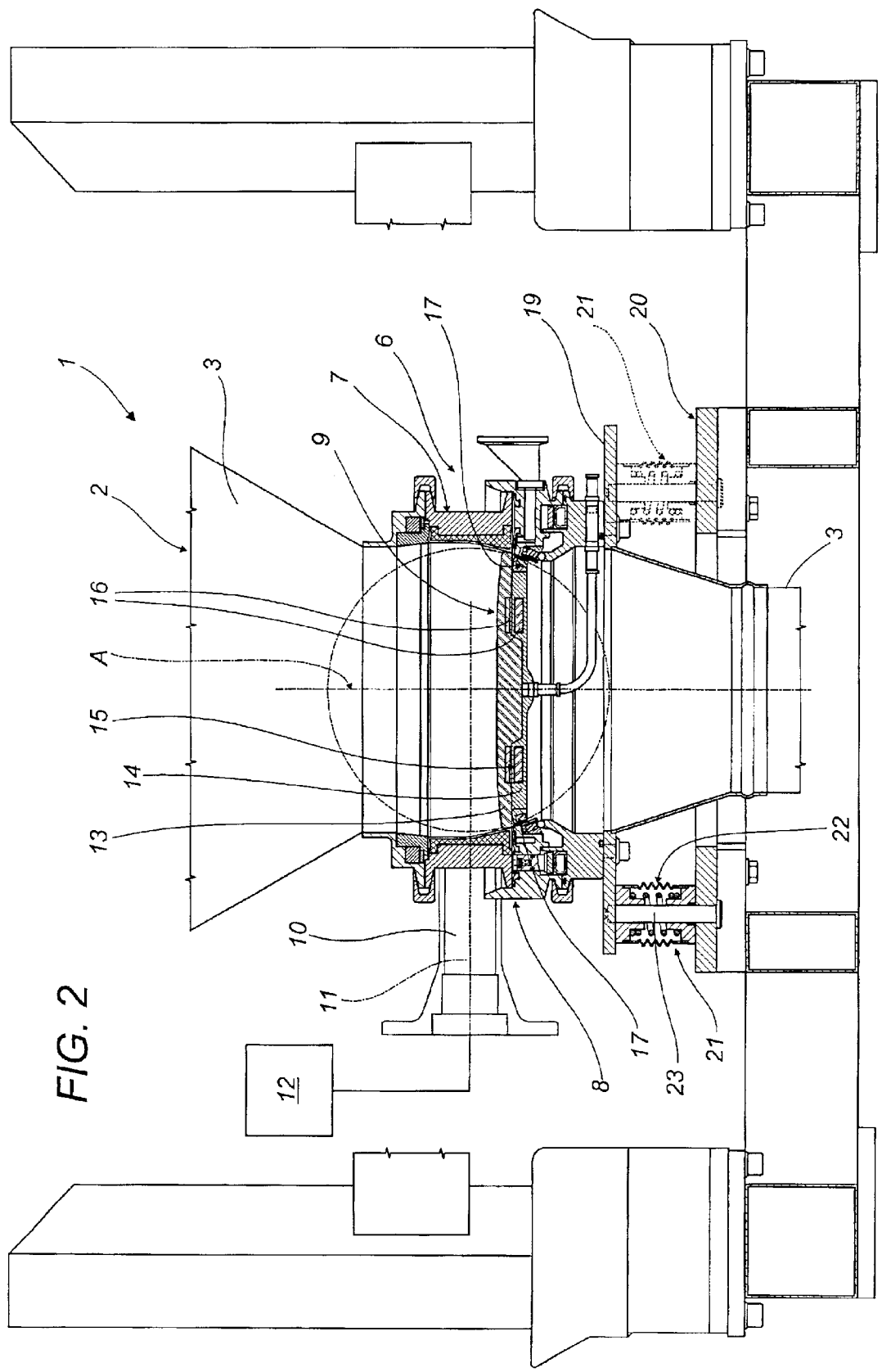
FIGS. 2 and 3 are section views of a part of the unit shown in FIG. 1 during two stages of its operation.
Figure 3:
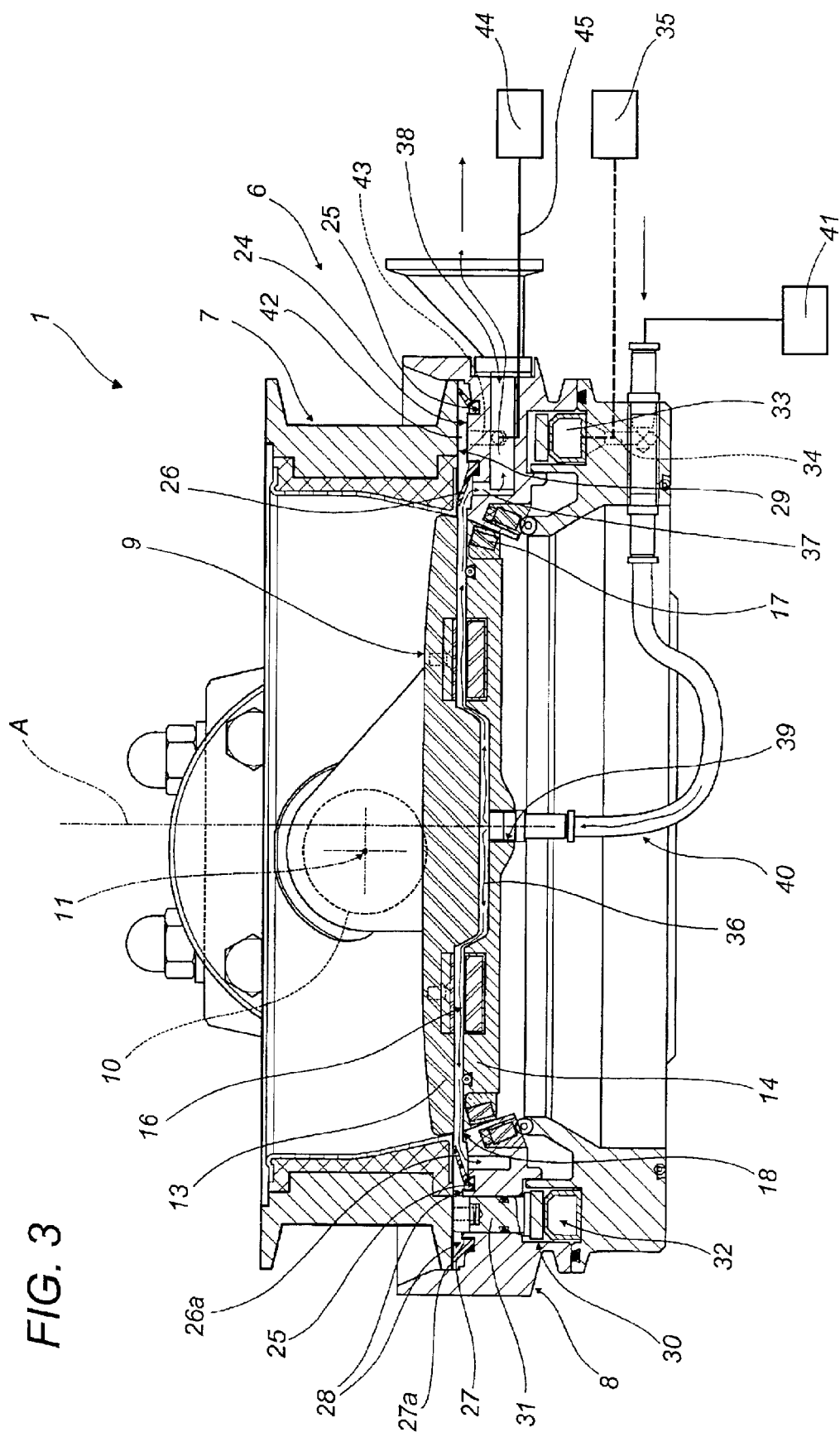

As shown in FIGS. 1, 2 and 3, the unit 1, which, at least in the section illustrated in FIGS. 2 and 3 extends along a substantially vertical axis A, comprises a valve element 6 connecting the container 3 to the tube 5 and consisting of a first, upper annular element 7 connected to the lower end of the container 3, and a second, lower annular element 8 coaxial with the first and forming the infeed end of the tube 5.

The first upper annular element 7 mounts a butterfly shutter element 9 forming part of the valve element 6 itself and mounted on a shaft 10 whose axis 11 is transversal to the axis A. The shaft 10 is connected to an actuator, schematically illustrated as a block 12, that rotates the shutter 9 in both directions about the axis 11 in such a way as to open and close the shutter 9, the open position being shown by the dashed line in FIG. 2.

The shutter element 9 further comprises a first, disc-shaped shutoff element 13 which is rigidly connected to the shaft 10 and whose diameter is substantially the same as the outfeed opening of the container 3, and a second disc-shaped shutoff element 14 consisting of a disc-shaped screen whose diameter is substantially the same as that of the infeed of the lower annular element 8.

The two shutoff elements 13 and 14 making up the shutter 9, described in more detail in European patent publication EP 1.043.252, the disclosure of which is incorporated herein by reference, are firmly connected to each other by releasable means 15, which, in the embodiment illustrated, consist of permanent magnets 16. Looking in more detail, with reference to FIGS. 2 and 3, the releasable means 15 also comprise a plurality of permanent magnets 17 positioned between a perimetric edge of the disc-shaped screen 14 and an inner edge 18 of the lower annular element 8. It is essential to point out that the permanent magnets 16 positioned between the shutoff elements 13 and 14 generate an axial force of attraction along the axis A, whilst the permanent magnets 17 generate a lateral force of attraction between the perimetric edge of the screen 14 and the edge 18 of the annular element 8. The forces of attraction of the magnets 16 and 17 are balanced in such a way that when the shutter 9 is open, the forces of attraction of the magnets 16 overcome those of the magnets 17, thus holding the shutoff elements 13 and 14 together, whereas, when the first and second annular elements 7 and 8 have to be separated in the direction of the axis A, as shown in FIG. 5, the forces of attraction generated by the magnets 17 overcome those of the magnets 16, allowing the shutoff elements 13 and 14 to be detached from each other, while remaining attached, respectively, to the lower edge of the first upper annular element 7 and to the upper edge 18 of the lower annular element 8.

Figure 5:
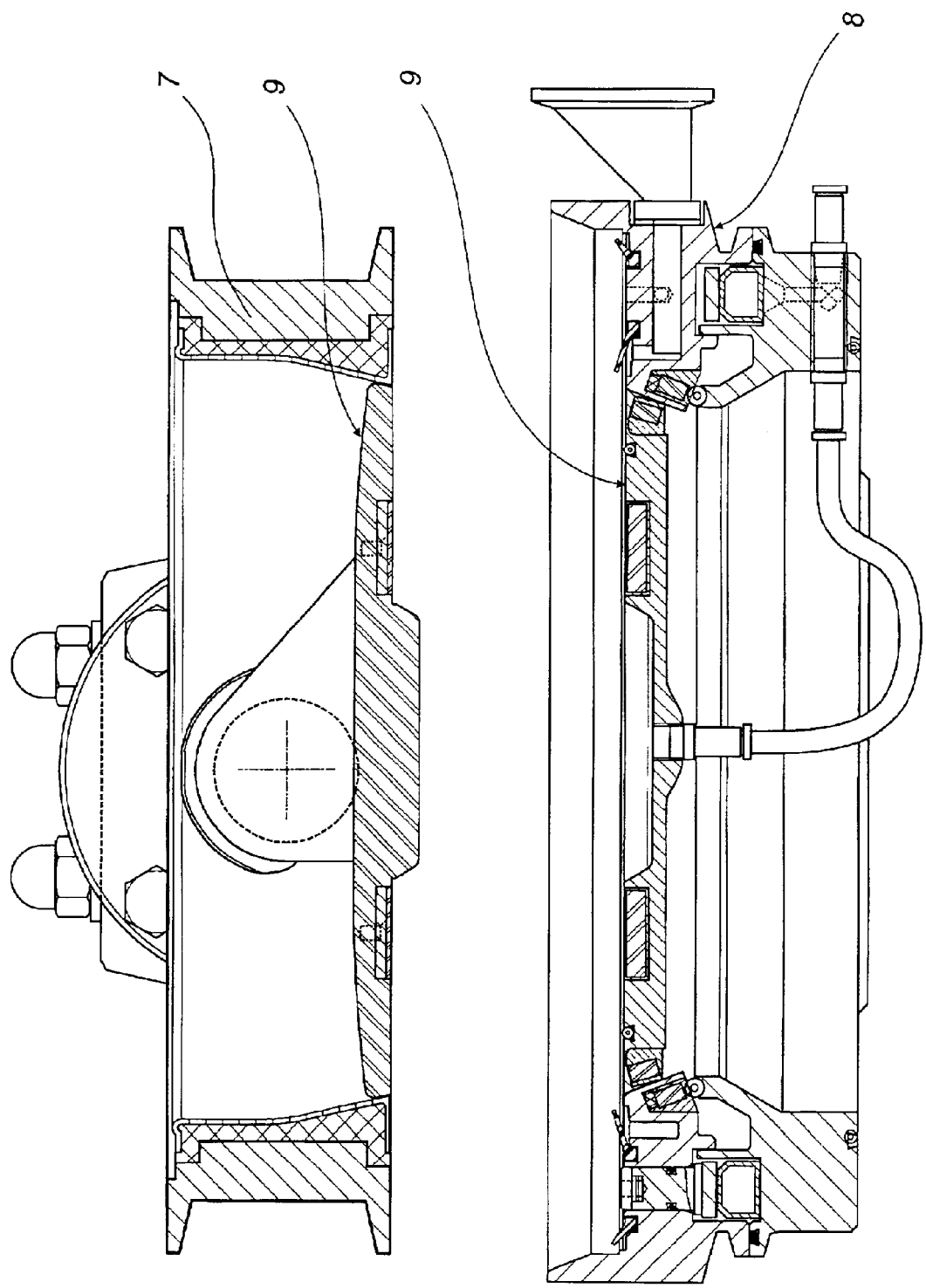
FIG. 5 illustrates the part of the unit shown in FIGS. 2 and 3 in yet another operating stage.

As shown in FIGS. 2, 3 and 5, the second lower annular element 8 is mounted on a perforated plate 19 which is in turn mounted on a frame 20 with interposed elastic means 21 consisting of three vertical springs 22 wound around respective shafts 23 fixed between the plate 19 and the frame 20. The elastic means 21, together with the shafts 23, enable the outfeed of the container 3 to be correctly aligned with the valve element 6 during assembly of the unit 1, and also allow the two annular elements 7 and 8 to be moved apart, for the reasons explained below.

Figure 4:
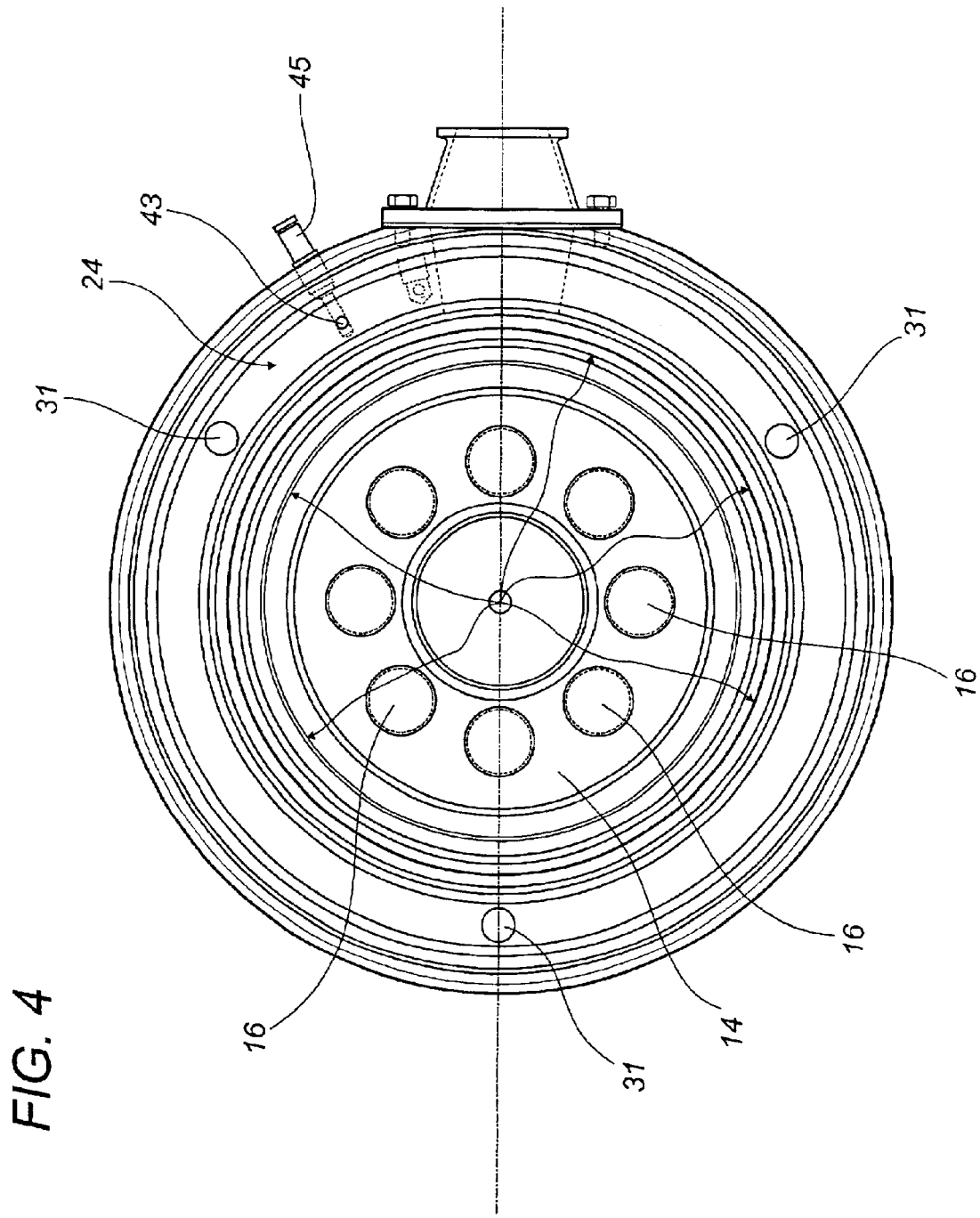
FIG. 4 is a schematic plan view of a detail from FIGS. 2 and 3.

As shown in FIGS. 2, 3 and 4, there are two concentric annular seats 25 located along an upper base 24 of the lower annular element 8 and designed to accommodate an inner seal 26 and an outer seal 27 constituting sealing means 28 acting between the annular base 24 of the lower element 8 and an annular base 29 of the upper annular element 7 facing it.

The seals 26 and 27 each present a lip 26a and 27a projecting, respectively, inwards and outwards from the annular elements 7 and 8.

Between the first annular element 7 and the second annular element 8, there are separating means 30 comprising a plurality of pistons 31 mounted at equal angular intervals in the lower annular element 8 and sliding in a direction parallel to the axis A in respective seats giving onto the base 24 between the two seals 26 and 27. Below the pistons 31 there are pneumatic means 32 consisting of an annular air chamber 33 connected through a hose 34 to a source of compressed air 35 which, by inflating and deflating the air chamber 33, enables the pistons 31 to move along their axes between a lowered, rest position and a working position. The lowered position is illustrated in FIG. 2, and at the lowered position, the first annular element 7 and the related first shutoff element 13 are in contact with the second annular element 8 and with the related second shutoff element 14.

In the second, working position, illustrated in FIG. 3, the first annular element 7 and the first shutoff element 13 are separated by a small defined distance from the second annular element 8 and from the second shutoff element 14. The separation is achieved by overcoming the force of attraction of the magnets 16 and the resistance of the elastic means 21, thus forming between the shutoff elements 13 and 14 a gap 36 that is delimited by the inner seal 26 with the lip 26a.

On the upper base 24 of the lower annular element 8, close to the inner seal 26 and on the side of this opposite the seal 27, there is an annular groove 37 which allows the gap 36 to communicate with an outlet conduit 38. The inner seal 26 acts as a valve which, through the lip 26a, closes the groove 36 when the two annular elements 7 and 8 are contact with each other and the pistons 31 are in the rest position (FIG. 2), and opens the groove 37 when the two annular elements 7 and 8 are separated and the pistons 31 are in the working position (FIG. 3). In the open position, the lip 26a of the seal 26 is raised, detached from the groove 37 and in contact with the base 29 of the upper annular element 7.

Following the separation of the two bases 24 and 29 of the second annular element 8 and of the first annular element 7, the two seals 26 and 27 form between their respective lips 26a and 27a an airtight annular seat 42.

On the lower shutoff element 14, there is a central hole 39 connected via a supply conduit 40 to a source 41 of a cleaning fluid, which may consist of air or other gas or a cleaning liquid of any kind, with water or solvents added.

The base 24 of the second annular element 8 has at least one hole 43 in it to connect the annular seat 42 via a conduit 45 to a vacuum source 44 designed to create a negative pressure inside the seat 42 such as to ensure the airtight seal of the seals 26 and 27 so as to isolate the gap 36 from the surrounding environment.

During use, operation of the unit 1 can be considered as starting from a condition where it is discharging material from a container 3 to a user unit 4 and the shutter 9 is in the open position, with the shutoff elements 13 and 14 in contact with each other and lying in a plane parallel to the axis A (FIG. 2). Upon completion of the discharging step, the actuator 12 moves the shutter 9 back to the closed position illustrated in FIG. 3.

At this point, the compressed air source 35 inflates the annular air chamber 33 and pushes the pistons 31 upwards, causing the annular elements 7 and 8 and the shutoff elements 13 and 14 to move slightly apart, thus forming the gap 36. At the same time, the vacuum source 44 is connected to the annular seat 42, the seals 26 and 27 isolate the gap 36 from the surrounding environment and, via the supply conduit 40, the source of cleaning fluid 41 causes the fluid to flow into the gap 36 through the central hole 39.

The fluid flows radially through the gap and over the surface of both the shutoff elements 13 and 14, removing all the product residue that sticks especially to the perimetric edges of the two shutoff elements. The raised lip 26a of the seal 26 then diverts the cleaning fluid into the annular groove 37 which conveys it out through the outlet conduit 38.

The cleaning operation is performed in a completely isolated environment which prevents contamination or cross-contamination of the surroundings. When cleaning has been completed, the vacuum source 44 is switched off, the two annular elements 7 and 8 are separated completely, as shown in FIG. 5, following removal of the conventional locking means (not illustrated) and, overcoming the force of attraction of the magnets 16, the shutoff element 13 remains in place to keep the bottom edge of the upper annular element 7 closed, while the shutoff element 14 in contact with the upper edge 18 of the lower annular element 8 keeps the lower annular element 8 closed after the respective surfaces which are now going to come into contact with the surrounding environment have been thoroughly cleaned of any product residue.

It will be understood that the invention can be subject to modifications and variations without thereby departing from the scope of the inventive concept. Moreover, all the details of the invention may be substituted by technically equivalent elements.

What is claimed is:

1. A unit for discharging loose material from a dispensing device to a user unit, comprising a tube leading to the user unit, a valve element connecting the dispensing device to the tube infeed end, having an axis extending in a defined direction, the valve element comprising a first annular element, coaxial with the infeed end and comprising shutter means equipped with a first shutoff element and a second shutoff element connected to each other by releasable means and being mobile from a position in which the infeed end of the tube is closed by an airtight seal to a position where it is open, wherein the valve element comprises a second annular element coaxial with the first annular element and forming the infeed end of the tube, the first shutoff element consisting of a disc-shaped element for closing the first annular element, and the second shutoff element consisting of a screen for closing the second annular element, the valve element further comprising sealing means positioned between the first and second annular elements, separation means mobile between a first rest position where the first annular element and the related first shutoff element are respectively in contact with the second annular element and the related second shutoff element and a working position where the first and second annular elements are separated respectively from the related first and second shutoff elements in such a way as to form at least between the shutoff elements a gap that is delimited by the sealing means, and means for cleaning the gap also being provided.

2. The unit according to claim 1, wherein the separation means comprise pushing means that move in a direction parallel to the axis, are mounted in at least one of the annular elements and, in the working position, are designed to engage with the other annular element.

3. The unit according to claim 2, wherein the pushing means consist of pistons, the separation means comprising pneumatic means for actuating the pistons.

4. The unit according to claim 3, wherein the pneumatic means comprise an annular air chamber inside at least one of the annular elements.

5. The unit according to claim 1, wherein at least one of the annular elements is mounted on a frame with interposed elastic opposing means that give in a direction substantially parallel to the axis under the action of the separation means.

6. The unit according to claim 1, wherein the sealing means comprise at least one annular seal.

7. The unit according to claim 6, wherein the sealing means comprise two annular seals coaxial with the axis and forming between the annular elements, at least when the latter are separated, a seat having the shape of a circular crown.

8. The unit according to claim 7, wherein the sealing means comprise at least one through hole connecting the seat to respective vacuum generating means.

9. The unit according to claim 1, wherein the cleaning means comprise a supply conduit connecting a cleaning fluid source to the gap, and an outlet conduit connected to the gap.

10. The unit according to claim 9, wherein the outlet conduit connected to the gap through an annular groove that is connected to the gap through one of the two seals when the annular elements are in the separated condition.

11. A method for discharging loose material from a dispensing device to a user unit comprising a tube leading to one end of the user unit itself, a valve element connecting the dispensing device to the tube infeed end, having an axis extending in a defined direction, the valve element comprising a first annular element coaxial with the infeed end, and shutter means equipped with a first shutoff element and a second shutoff element connected to each other by releasable means and being mobile from a position in which the infeed end of the tube is closed by an airtight seal to a position where it is open, the method comprising the steps of: separating the first annular element from a second annular element, which is coaxial with the first annular element and which forms the infeed end of the tube, in such a way as to form a gap between the shutoff elements; isolating the gap through sealing means positioned between the first and second annular elements; and cleaning the gap.

12. The method according to claim 11, wherein at least one of the annular elements is supported elastically.

13. The method according to claim 11, further comprising the steps of forming a seat having the shape of a circular crown with the sealing means and between the annular elements, at least when the latter are separated; and applying a vacuum to the seat when the annular elements are separated.

14. The unit according to claim 2, wherein at least one of the annular elements is mounted on a frame with interposed elastic opposing means that give in a direction substantially parallel to the axis under the action of the separation means.

15. The unit according to claim 3, wherein at least one of the annular elements is mounted on a frame with interposed elastic opposing means that give in a direction substantially parallel to the axis under the action of the separation means.

16. The unit according to claim 4, wherein at least one of the annular elements is mounted on a frame with interposed elastic opposing means that give in a direction substantially parallel to the axis under the action of the separation means.

* * * * *